No. 756,905. PATENTED APR. 12, 1904.
C. H. STOELTING.
BAROMETER.
APPLICATION FILED AUG. 15, 1903.
NO MODEL. 2 SHEETS—SHEET 1.
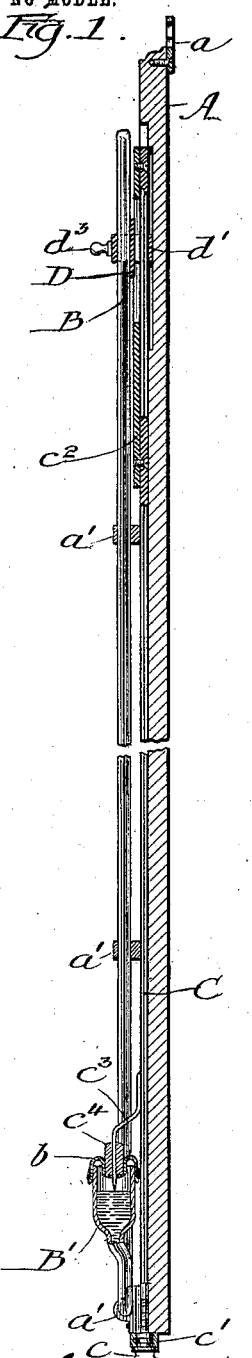
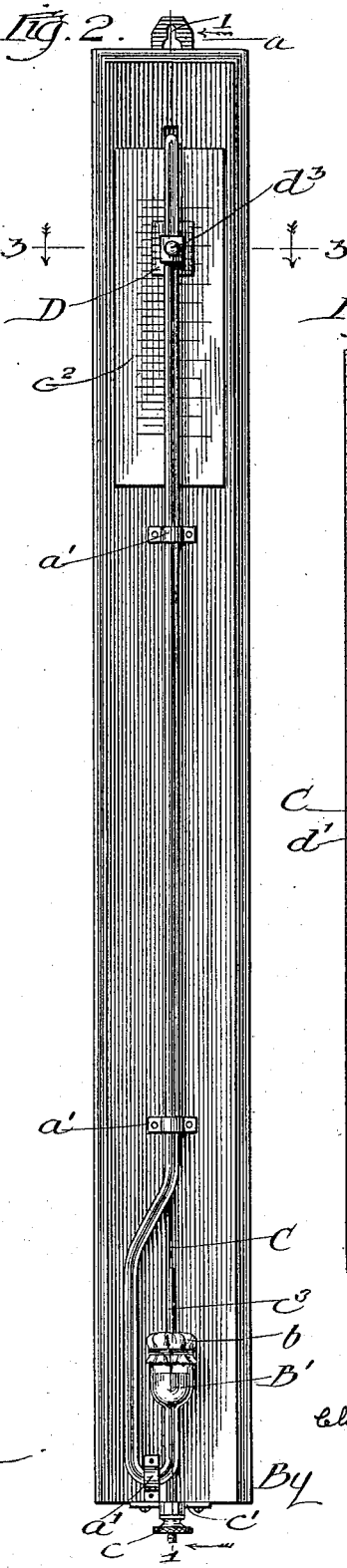
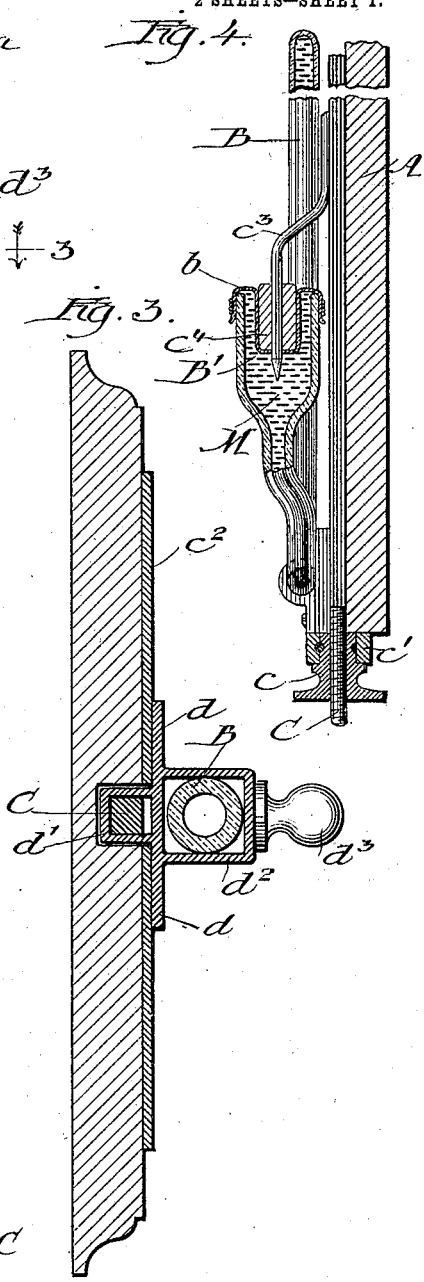
Witnesses:
Frank J. Blanchard
N. DeLong
Inventor:
Christian H. Stoelting
By Hugh K. Hadley
Attorney.

No. 756,905. PATENTED APR. 12, 1904.
C. H. STOELTING.
BAROMETER.
APPLICATION FILED AUG. 15, 1903.
NO MODEL. 2 SHEETS—SHEET 2.
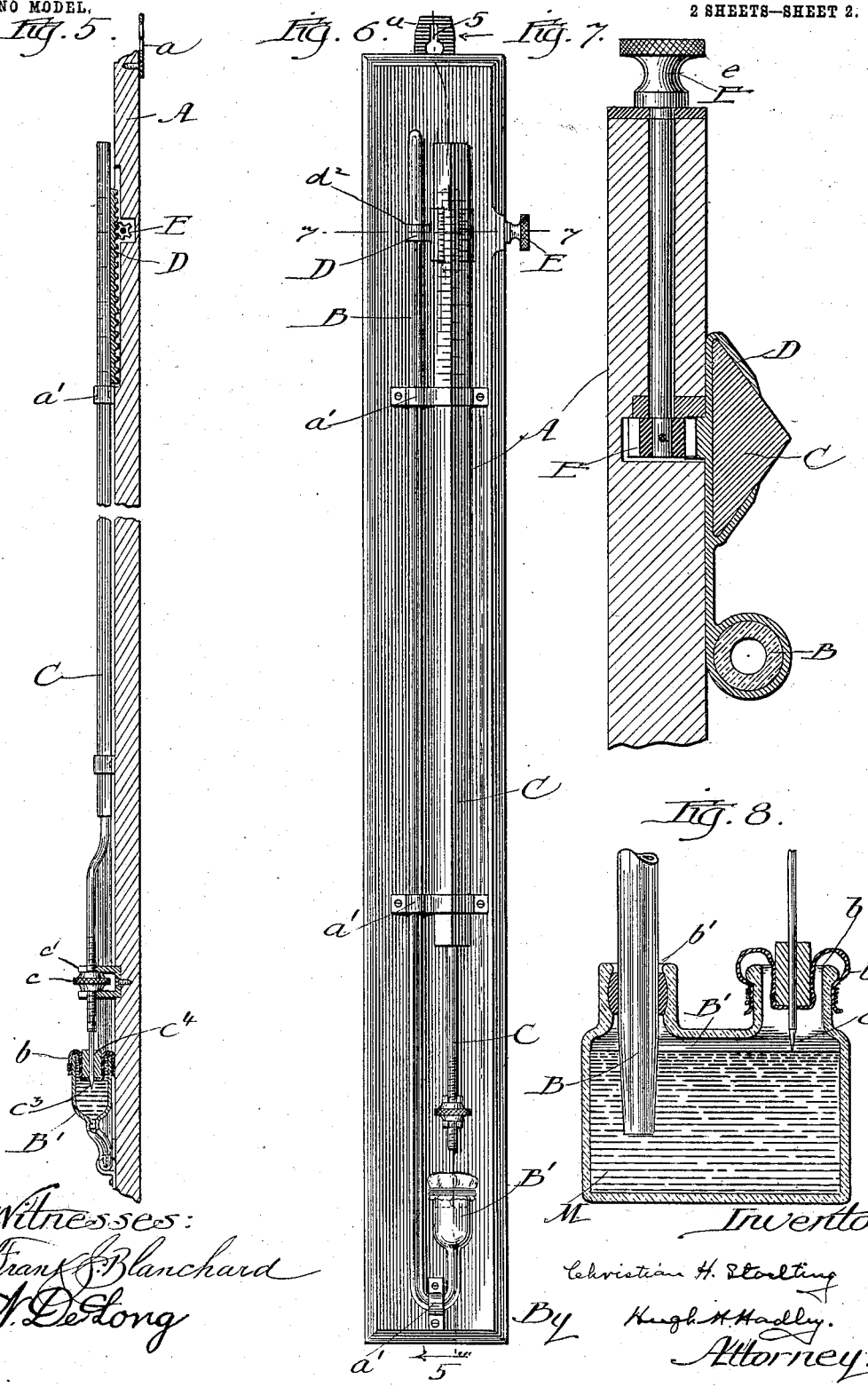

No. 756,905.                                              Patented April 12, 1904.

UNITED STATES PATENT OFFICE.

CHRISTIAN H. STOELTING, OF CHICAGO, ILLINOIS.

BAROMETER.

SPECIFICATION forming part of Letters Patent No. 756,905, dated April 12, 1904.

Application filed August 15, 1903. Serial No. 169,602. (No model.)

*To all whom it may concern:*

Be it known that I, CHRISTIAN H. STOELTING, of the city of Chicago, county of Cook, and State of Illinois, have invented a certain new and useful Improvement in Barometers; and I do hereby declare that the following is a full and exact description thereof, reference being had to the accompanying drawings.

My invention relates to that class of barometers known as "mercurial" barometers, and has special reference to the particular class of siphon-barometers. In this class of barometers a tube is provided whose upper end is closed and whose lower end is open and has contact with a larger vessel or cistern open to the air. The air is exhausted from the said tube, and the said cistern is filled with mercury, and the pressure of the air upon the mercury in the cistern forces the mercury up into the said tube. The rising and falling of the mercury in the tube is then measured to calculate the comparative pressure of the atmosphere. The basis as generally used is the sea-level, where the mercury in the tube at a certain temperature will rise about thirty inches. The surface of the mercury in the cistern must be taken as the lower end of the tube, and the height of the column in the tube is the distance from the surface of the mercury in the cistern to the top of the column in the tube. Inasmuch as the surface of the mercury in the cistern falls as the column in the tube rises, an exact relation between the points must be preserved. A number of means have heretofore been employed to effect this result, all of which are more or less unsatisfactory. One of the elements of my invention constitutes an effective means to this end. Again, the safe shipment of mercurial barometers has much annoyed manufacturers. The weight of the mercury precludes the idea of packing the barometer with the mercury movable in the glass tube. The danger of breakage has never been satisfactorily overcome. This I accomplish, and therein lies another element of my invention. These elements, together with particular devices to accomplish the same and ideas for better and more economic manufacture and use, constitute my invention.

In the drawings, Figure 1 presents a perpendicular sectional view of my barometer, taken through line 1 1 of Fig. 2, which presents a front view of the same. Fig. 3 is a horizontal view taken through line 3 3 of Fig. 2. Fig. 4 presents an enlarged detail view of the lower end of Fig. 1. Fig. 5 presents a perpendicular sectional view of a modified form of my invention, taken through line 5 5 of Fig. 6, which presents a front view of this modified form. Fig. 7 is a horizontal sectional view of Fig. 6, taken through line 7 7. Fig. 8 shows a perpendicular sectional view of that form of barometer known as the "Torricelli" with my invention applied.

More particularly described, A represents the frame or back for my barometer, which is provided with a suitable hanging loop $a$, whereby it is designed to be suspended.

B represents the barometer-tube, and B' the cistern or the enlarged upturned end of the siphon. This tube B and the cistern B', which in the siphon are one piece, are permanently secured to the frame A by the securing-strips $a'$ $a'$ $a'$. Over the mouth of the cistern is securely tied or otherwise fitted a loose bag of leather or some other soft material $b$. Buried within a groove in the face of the frame A and opposite the tube B is a rod C, which is movably connected with said frame A. The said rod C is threaded at its lower end and engages with a knurled nut $c$, secured to the lower end of the frame A by a shoulder-bearing $c'$. By turning the nut $c$ the rod C is forced up and down along the face of the frame A. To the rod C, near its upper end, is attached a scale-plate $c^2$. Projecting outward and downward from the rod C at a point just above the surface of the cistern B' is a small pointed metal arm or "ivory point" $c^3$. This ivory point $c^3$ passes through the leather bag $b$ and into the cistern B'. Surrounding the arm of the ivory point $c^3$ and immediately outside of the leather bag $b$ is a plunger $c^4$, which is slightly smaller than the mouth of the cistern B'.

Opposite the rod C the scale-plate $c^2$ is slotted for a distance to allow for engagement with the rod C of a vernier D. This vernier D consists of a graduated plate $d$, an inwardlyprojecting loop $d'$, and outwardly-projecting loop $d^2$, upon the face of which is fitted the handle $d^3$. The graduated plate $d$ lies upon the scale $c^2$ and has sliding engagement therewith. The loop $d'$ passes through the said slotted portion of the scale-plate $c^2$ and encircles in close contact the rod C. The loop $d^2$ encircles the tube B, and its lower edge is sharply defined for the purpose of setting it accurately opposite the surface of the mercury column in the tube B. The handle $d^3$ is intended to present means for sliding the vernier D by hand along the tube B and the rod C.

In Figs. 5, 6, and 7 I illustrate certain modifications in my invention in this: Instead of the tube B being of a gooseneck form, as shown in Fig. 2, I turn it in the form of a letter J and fix my rod C on the surface of the frame A and at the side of the tube B. In lieu of the scale-plate $c^2$, as hereinbefore described, I enlarge the rod C and place the graduations upon the rod C. Instead of the ivory point $c^3$ projecting from the face of the rod C, I form the lower end of the rod C into an ivory point $c^3$, as shown in Fig. 5. In this modification I thread the rod C along part of its length and fit thereon the knurled nut $c$, held between the apertured lugs or shoulders $c'$ $c'$, projecting from the face of the frame A. In the vernier of this modification the loop $d^2$ projects to the side to encircle the tube B, instead of forward, as hereinbefore described. I also illustrate means for more accurately moving the vernier, which modification is shown in detail in the sectional view, Figs. 5 and 7. It consists of a rack and pinion E, which lies buried within the face of the frame A and back of the vernier D, which encircles the graduated rod C. The engagement of the vernier D with the rack and pinion E is effected through the slotted face of the frame A. This device is operated by a knurled head $e$ of the pinion-shaft projecting from the side of the frame A. This modification may also be applied to the first form described herein.

Fig. 8 shows the application of my invention to the Torricelli barometer. In application to this form of barometer I provide two mouths $b'$ $b^2$ to the cistern B'. Through one of these, $b'$, the tube B passes into the cistern, and the other, $b^2$, is covered with the leather bag $b$ and through it passes the ivory point $c^3$.

In operation the ivory point $c^3$ is raised or lowered by the operation of the nut $c$ upon the rod C until the point rests upon the surface of the mercury M. The vernier D is then made to slide upon the tube B until the edge of the loop $d^2$ registers with the top of the column of mercury in the tube B. The reading is then taken and shows the height of the column of mercury in the tube or the distance from the surface of the mercury in the cistern to the top of the column in the tube B.

In preparing the barometer for packing and shipment the rod C is lowered by turning the nut $c$, thereby driving the leather bag $b$ and the plunger $c^4$ into the cistern B', thus displacing the mercury by forcing it into the tube B. (See Fig. 4.) By this process the tube B is filled with the mercury, which becomes immobile, and the barometer can safely be packed for shipment. In order to release the mercury from the tube B after shipment and unpacking, I turn the nut $c$ to raise the rod C and to withdraw the bag $b$ and plunger $c^4$ from the cistern B', which being done the mercury or the surplus thereof flows from the tube B back into the cistern B' and the barometer is again ready for use.

What I claim as my invention is—

1. A barometer consisting of a tube permanently fixed to a frame and closed at its upper end, and having engagement at its lower end with a cistern partially filled with mercury, a loose bag securely fixed over the mouth of the said cistern, an ivory point penetrating said loose bag, a graduated scale lying upon the face of said frame and opposite said tube, which ivory point and scale are permanently attached to a rod having sliding engagement with said frame, and means for actuating said rod.

2. A barometer consisting of a barometric tube and cistern permanently secured to a frame, a loose bag secured over the mouth of said cistern, a sliding rod fitted to said frame and carrying an ivory point which extends into the mouth of the said cistern and penetrates the said bag, a graduated scale permanently fixed upon said sliding rod and opposite the said tube, and means for actuating the said rod.

3. A barometer consisting of a barometric tube and cistern permanently secured to a frame, a loose bag secured to the mouth of said cistern a sliding rod lying on said frame parallel to said tube, an ivory point and a graduated scale fixed to said rod, and means for actuating said rod.

4. A barometer consisting of a barometric tube and cistern permanently affixed to a frame, a sliding rod parallel to said tube, and bearing an ivory point and graduated scale, a vernier having sliding engagement with said rod, and means for actuating said vernier and said sliding rod.

5. A barometer consisting of a barometric tube and cistern permanently affixed to a frame, a rod affixed to said frame parallel with said tube and having sliding engagement with said frame, an ivory point and a graduated scale affixed to said rod, means of actuating said rod, and a vernier having sliding engagement with said rod and graduated scale and means for actuating said vernier consisting of a rack affixed to the rear portion of said vernier and a coacting pinion buried within said frame, and having a headed arm projecting from the side of said frame.

6. In combination with a barometric tube and cistern permanently secured to a frame, a sliding rod affixed to said frame and parallel with said tube, an ivory point and graduated scale permanently affixed to said rod, and means of actuating said rod.

7. In a barometer, the combination with a permanently-fixed tube and cistern, of a loose bag secured over the mouth of said cistern, a movable ivory point penetrating said bag, a plunger fitted upon said ivory point, and means for driving said plunger and ivory point into said cistern and withdrawing them therefrom.

8. A barometer consisting of a barometric tube and cistern permanently affixed to a frame, a loose bag secured over the mouth of said cistern, a sliding rod fitted upon said frame, an ivory point permanently secured to said rod, a plunger secured at the mouth of said cistern to said ivory point, and means for actuating said sliding rod.

CHRISTIAN H. STOELTING.

Witnesses:
RUSSELL S. CLARK,
IDA M. PEARSON.